(12) United States Patent
Figuerado et al.

(10) Patent No.: US 8,366,464 B1
(45) Date of Patent: Feb. 5, 2013

(54) RETRACTION ARM TO EXTRACT A MEZZANINE CIRCUIT BOARD CONNECTOR FROM A MOTHERBOARD CONNECTOR

(75) Inventors: Stephen N. Figuerado, Round Rock, TX (US); Martin Hardis, Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 13/218,260

(22) Filed: Aug. 25, 2011

(51) Int. Cl.
*H01R 13/62* (2006.01)

(52) U.S. Cl. ....................................... 439/160

(58) Field of Classification Search .......... 439/157–160; 361/798
See application file for complete search history.

(56) References Cited

U.S. PATENT DOCUMENTS

| | | | |
|---|---|---|---|
| 3,767,974 A | 10/1973 | Donovan, Jr. et al. | |
| 4,232,926 A * | 11/1980 | Inouye et al. | 439/157 |
| 5,003,431 A * | 3/1991 | Imsdahl | 361/798 |
| 5,074,800 A * | 12/1991 | Sasao et al. | 439/157 |
| 5,367,761 A | 11/1994 | Kabat et al. | |
| 5,445,531 A | 8/1995 | Billman et al. | |
| 5,500,518 A | 3/1996 | Olzak et al. | |
| 5,506,758 A * | 4/1996 | Cromwell | 361/798 |
| 6,687,134 B2 | 2/2004 | Vinson et al. | |
| 6,762,934 B2 * | 7/2004 | Kitchen et al. | 361/679.58 |
| 7,029,298 B2 * | 4/2006 | Jiang | 439/157 |
| 7,345,890 B2 | 3/2008 | DeNies et al. | |
| 7,575,451 B1 | 8/2009 | Jaramillo et al. | |
| 7,583,517 B2 | 9/2009 | Hartman et al. | |
| 7,626,826 B2 | 12/2009 | Stewart et al. | |
| 7,666,019 B2 | 2/2010 | Jaramillo et al. | |
| 7,746,654 B2 | 6/2010 | Franz et al. | |
| 2002/0090851 A1 * | 7/2002 | Wrycraft | 439/159 |
| 2004/0174686 A1 * | 9/2004 | Rubenstein | 361/801 |
| 2006/0035493 A1 * | 2/2006 | Jiang | 439/157 |

* cited by examiner

*Primary Examiner* — Chandrika Prasad

(74) *Attorney, Agent, or Firm* — Hamilton & Terrile, LLP; Robert W. Holland

(57) ABSTRACT

An information handling system mezzanine circuit board disposed in a parallel configuration over a motherboard is selectively coupled and de-coupled at the motherboard with a retraction and latching device that translates retraction force applied at an accessible actuation portion to push upward from below the mezzanine circuit board. A retraction portion of the retraction and latching device provides an upward force at the bottom surface of the mezzanine circuit board to separate the mezzanine circuit board connector from the motherboard connector so that an end user can lift the mezzanine circuit board away from the motherboard.

17 Claims, 4 Drawing Sheets

RETRACTION ARM TO EXTRACT A MEZZANINE CIRCUIT BOARD CONNECTOR FROM A MOTHERBOARD CONNECTOR

BACKGROUND OF THE INVENTION

1. Field of the Invention

The present invention relates in general to the field of information handling system component assembly, and more particularly to an information handling system printed circuit board extraction and latching device.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are typically built by assembling a wide variety of components in a chassis and interfacing the components through a main printed circuit board (PCB) known as a motherboard. For example, a motherboard integrates a main processor socket to accept a central processing unit (CPU) and other sockets to accept other processing components, such as a chipset and memory. Wires disposed in the motherboard communicate electrical signals between the processing component sockets. Processing components that are too big to actually couple to the motherboard, such as hard disk drives, are typically connected with wiring harnesses to connectors of the motherboard. The capability of an information handling system generally depends upon the types of components that are selected to interface through the motherboard. This allows end users flexibility in the purchase of information handling systems by selecting information handling systems with capabilities that match an intended task and with costs of a desired budget.

Often, components that interface with a motherboard are themselves assembled on a PCB, sometimes known as a daughter card or mezzanine card. In one common configuration, a daughter card has a connector at an end that inserts into a connector of the motherboard so that the daughter card extends perpendicular from the motherboard. A perpendicular assembly provides ready access to the PCB edges for assembly and removal, however, the height of the assembled system relative to the motherboard requires a relatively large chassis to contain the components. In the mezzanine configuration, the mezzanine card has a connector located on its bottom surface that connects to the motherboard connector so that the mezzanine card assembles parallel to the motherboard. A parallel or "stacked" assembly effectively compresses the height of the information handling system relative to the motherboard so that a shorter chassis can contain the components. Reduced chassis height is particularly helpful with server information handling systems, which stack vertically in a rack. In addition, a parallel assembly of a mezzanine board relative to a motherboard provides room to attach a heat sink that extends into an airflow over the motherboard for cooling of components of the mezzanine board.

One difficulty with the parallel configuration of a mezzanine board relative to a motherboard is that a restricted amount of space is typically available around the mezzanine board for assembly and disassembly to the motherboard. Other components coupled to the motherboard near the mezzanine board make grasping the PCB edges difficult. If, instead, an end user attempts to grasp a heat sink of the mezzanine board to pull the mezzanine board free from the motherboard connector, damage can occur to the mezzanine board. Since the connector of the mezzanine board is not typically visible when coupled to the motherboard, pulling on the heat sink can create a lateral force that damages the motherboard connector, the mezzanine board connector or the components and wiring of the mezzanine circuit board. The restricted space around the mezzanine board typically requires that small-sized retention hooks are generally used to secure the mezzanine board in place at the motherboard connector. These small retention hooks are difficult to manipulate in the small space typically available around the mezzanine board and easily broken.

SUMMARY OF THE INVENTION

Therefore a need has arisen for a system and method which provides improved coupling and de-coupling of a mezzanine circuit board to a connector.

In accordance with the present invention, a system and method are provided which substantially reduce the disadvantages and problems associated with previous methods and systems for coupling and de-coupling a mezzanine circuit board to a connector. A retraction arm translates an actuation force applied above a mezzanine circuit board to a retraction force applied from below the mezzanine circuit board to disengage a connector of the mezzanine circuit board from a motherboard connector for removal of the mezzanine circuit board from an information handling system.

More specifically, an information handling system processes information with plural processing components disposed on a motherboard. A connector on the motherboard couples to a mezzanine circuit board connector to support signal communication between the motherboard and processing components disposed on the mezzanine circuit board. A retraction and latching device selectively couples the mezzanine circuit board to the motherboard in a substantially parallel mezzanine configuration. To assemble the mezzanine circuit board, openings on the board align with alignment posts to seat the blind mated connectors below the surface of the mezzanine circuit board, and a downward pressure couples the connectors and engages a latching portion of a retraction arm to hold the mezzanine circuit board in place. To disassemble the mezzanine circuit board, a downward force applied at an actuation portion of the retraction arm is translated by a rotation portion into an upward force at a retraction portion of the retraction arm at the lower surface of the mezzanine circuit board proximate the connectors. The retraction portion pushes upward on the mezzanine circuit board to retract the mezzanine circuit board connector from the motherboard connector so that the mezzanine circuit board can be freely lifted from the motherboard.

The present invention provides a number of important technical advantages. One example of an important technical advantage is that a mezzanine circuit board couples and de-couples to a motherboard connector with the aid of a rotating extraction and latching device. During coupling of the mezzanine circuit board to a connector, the latching device guides the mezzanine circuit board into a proper alignment and provides audible and physical feedback of a proper coupling. During de-coupling, activation of the extraction lever translates an activation force to pivot around a rotation portion to provide an extraction force along the connector from beneath the mezzanine circuit board so that the risk of damage at the connectors and other critical components is reduced. The extraction lever presents itself as readily accessible to an end user and provides a one-handed extraction tool that an end user can actuate to free the connectors and then lift the mezzanine card away from the motherboard. The extraction and latching device does not add significantly to the footprint of the mezzanine card and, in one embodiment, folds when not in use to further reduce the footprint. The extraction and latching device improves the convenience of mezzanine circuit boards by providing greater ease of assembly and disassembly at an information handling system so that an information handling system chassis has a reduced height and is less expensive to build and maintain.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A retraction and latching device at an information handling system motherboard selectively couples a mezzanine circuit board by translating an actuation above the mezzanine circuit board to a retraction force applied at the bottom surface of the mezzanine circuit board. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
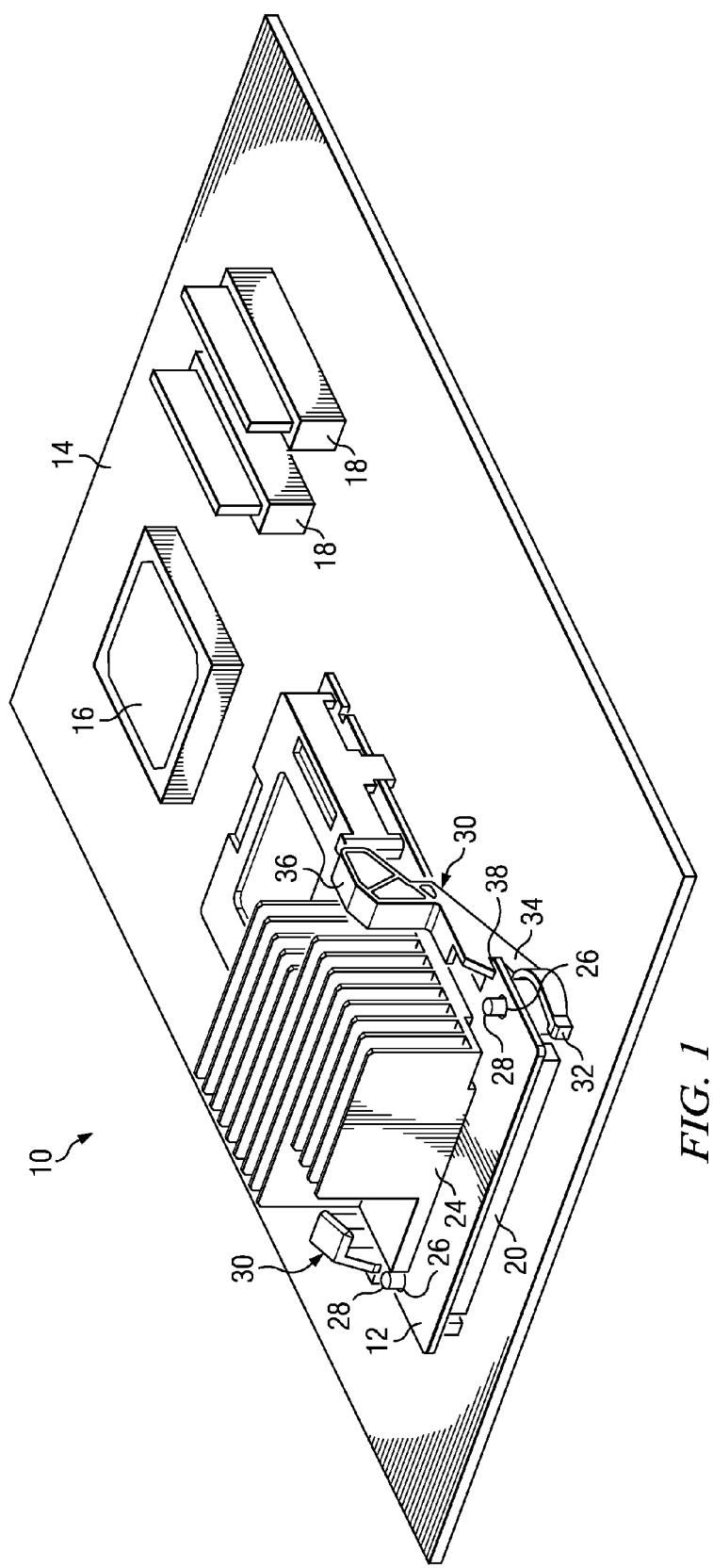
FIG. 1 depicts a perspective view of a mezzanine circuit board latched at an information handling system motherboard.

Referring now to FIG. 1, a perspective view depicts a mezzanine circuit board 12 latched at an information handling system 10 motherboard 14. Information handling system 10 processing information with a variety of processing components that communicate through motherboard 14, such as a CPU 16 that executes instructions and RAM 18 that stores instructions. Mezzanine circuit board 12 has a connector 20 that supports communication with processing components through a motherboard connector 22. When mezzanine circuit board 12 connector 20 and motherboard 14 connector 22 couple with each other, mezzanine circuit board 12 is disposed over motherboard 14 in a substantially parallel configuration that prevents ready access to connectors 20 and 22. Mezzanine circuit board 12 supports a variety of processing components that process information, such as for specific function. A heat sink 24 disposed over the processing components of mezzanine circuit board 12 removes heat from the processing components. Although heat sink 24 is accessible above mezzanine circuit board 12, pulling on heat sink 24 can create a lateral force at connectors 20 and 22 to damage the connectors or processing components of mezzanine circuit board 12.

Upon installation of mezzanine circuit board 12 at motherboard 12, openings 26 formed in mezzanine circuit board 12 align with a guide post 28 at each side of connector 22 so that mezzanine circuit board connector 20 aligns with motherboard connector 22. An end user pushes downward on mezzanine circuit board 12 to engage connectors 20 and 22. In addition, pushing a downward force on mezzanine circuit board 12 causes a retraction arm 30 on each side of motherboard connector 22 to engage with mezzanine circuit board 12 at a retraction portion 32 resting against the bottom surface of mezzanine circuit board 12. As retraction portion 32 is pushed downward, the force translates around a rotation portion 34 of retraction arm 30 into an upward force at an actuation portion 36 of retraction arm 30. As actuation portion 36 moves upward, a latching portion 38 of retraction arm 30 engages mezzanine circuit board 12 to maintain the substantially parallel position of the installed mezzanine circuit board 12. FIG. 1 depicts an installed mezzanine circuit board 12 having connectors 20 and 22 coupled to each other and latching portion 38 engaged to keep mezzanine circuit board 12 in the installed position. Guide posts 28 advantageously aid installation of mezzanine circuit board 12 where the connectors 20 and 22 are not visible to an end user performing the installation. In one embodiment, actuator portion 36 folds over to further compress the footprint of retraction arm 30, such as by folding over the upper surface of mezzanine circuit board 12.

Figure 2:
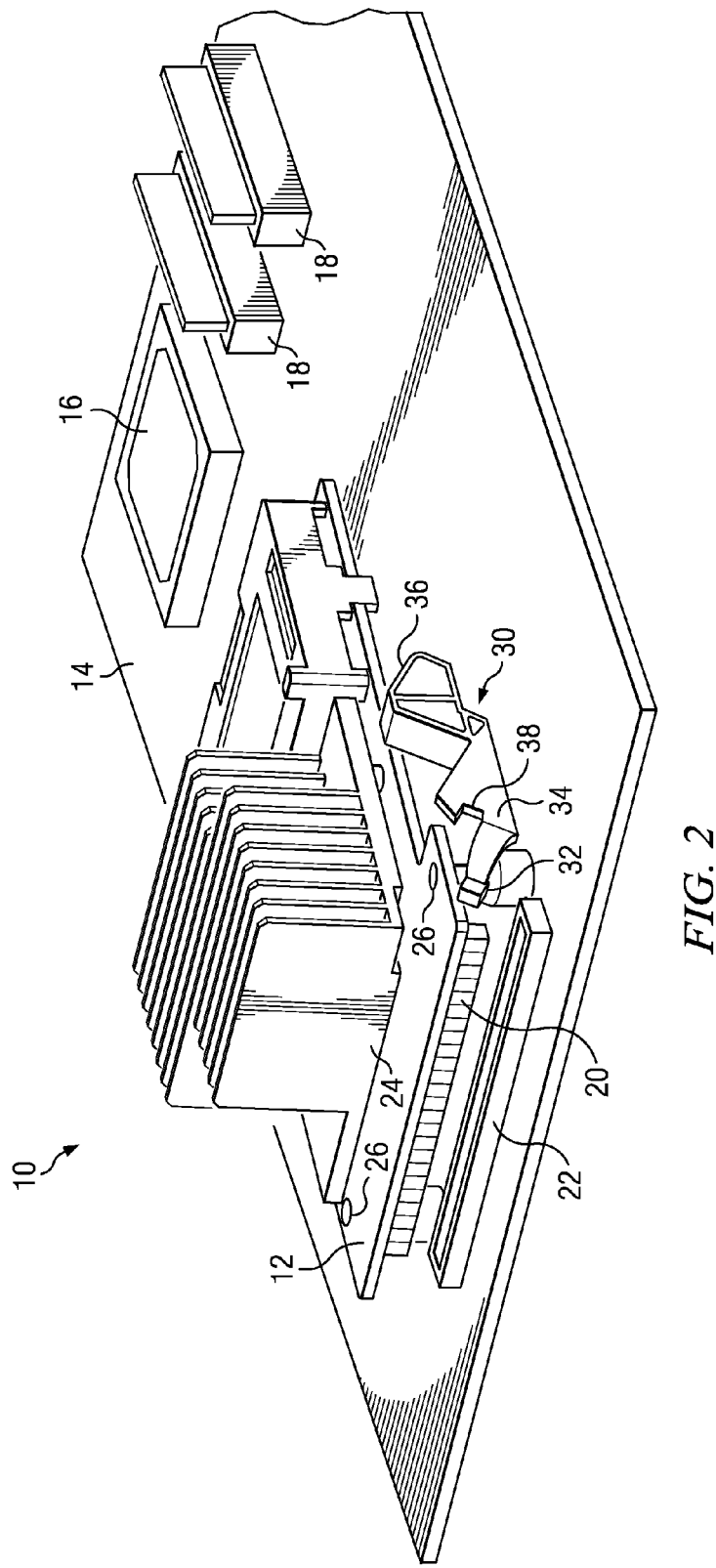
FIG. 2 depicts a perspective view of the mezzanine circuit board having its connector retracted from a connector of the motherboard.

Referring now to FIG. 2, a perspective view depicts the mezzanine circuit board 12 having its connector 20 retracted from a connector 22 of the motherboard 14. Retraction of mezzanine circuit board connector 20 from motherboard connector 22 is performed by placing a downward force on actuation portion 36 of retraction arm 30. As actuation portion 36 moves downward, latching portion 38 releases mezzanine circuit board 12 so that mezzanine circuit board 12 can move relative to motherboard 14. Continued downward motion of actuation portion 36 is translated by rotation portion 34 into an upward motion at retraction portion 32. Upward motion of retraction portion 32 against mezzanine circuit board 12 pushes mezzanine circuit board connector 20 upward and out of motherboard connector 20. Once connectors 20 and 22 are de-coupled, an end user can pick up mezzanine circuit board 12 for removal from the surface of motherboard 12. As depicted by FIGS. 1 and 2, a first and second retraction arm 30 are disposed on opposing sides of connectors 20 and 22 so that each retraction portion 32 lifts on opposing ends of connectors 20 and 22. In one alternative embodiment, a single actuator portion 36 translates force to two retraction portions 32, such as by connecting the retraction portions 32 to each other with an axle running beneath mezzanine circuit board 12.

Figure 3:
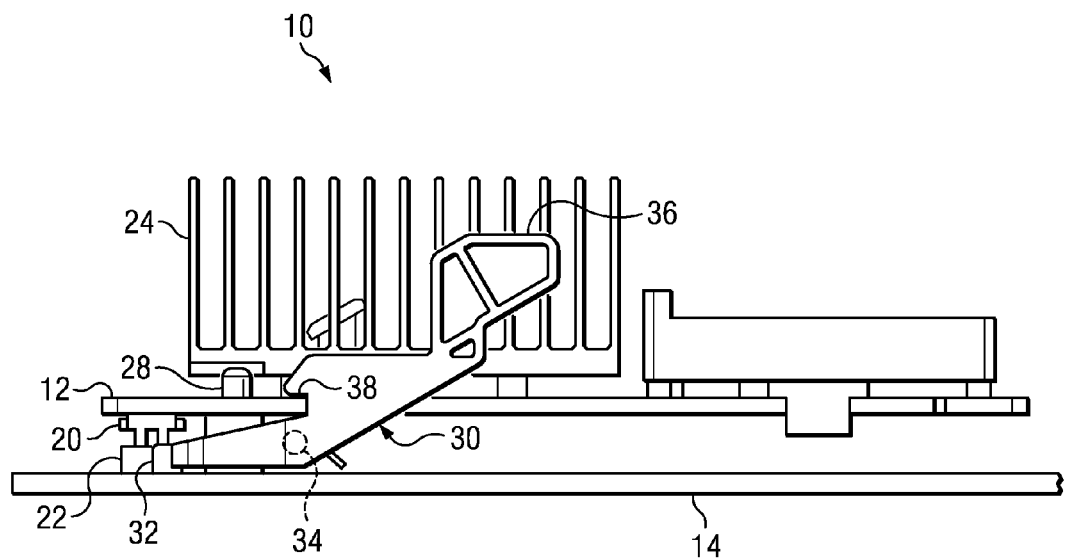
FIG. 3 depicts a side view of the retraction and latching device holding the mezzanine circuit board in a latched position.

Referring now to FIG. 3, a side view depicts the retraction and latching device holding the mezzanine circuit board 12 in a latched position. Latching portion 38 engages mezzanine circuit board 12 to keep mezzanine circuit board 12 in position. In the latched position, mezzanine connector 20 and motherboard connector 22 couple together to provide electrical communication signals between mezzanine circuit board 12 and motherboard 14. Mezzanine circuit board 12 is maintained above motherboard 14 in a substantially parallel position. Retraction portion 32 of retraction arm 30 rests below mezzanine circuit board 12 proximate connectors 20 and 22. Guide post 28 couples to motherboard 14 so that when mezzanine board openings 26 align with guide posts 28, connectors 20 and 22 align with each other, thus making assembly of mezzanine circuit board 12 to motherboard 14 less difficult even though connectors 20 and 22 are not visible to an end user during assembly. A smooth downward force on mezzanine circuit board 12 with openings 26 aligned to guide posts 28 pushes down on retraction arm 30 to automatically bring latching portion 38 into position over mezzanine circuit board 12. In one embodiment, a latching sound is generated when latching portion 28 engages mezzanine circuit board 12, such as a clicking sound. Shorter or taller mezzanine board configurations in height over motherboard 12 can be accommodated without affecting the dynamics of return spring or installation forces, and integrated flex snaps continually change in spring forces as stack height changes.

Figure 4:
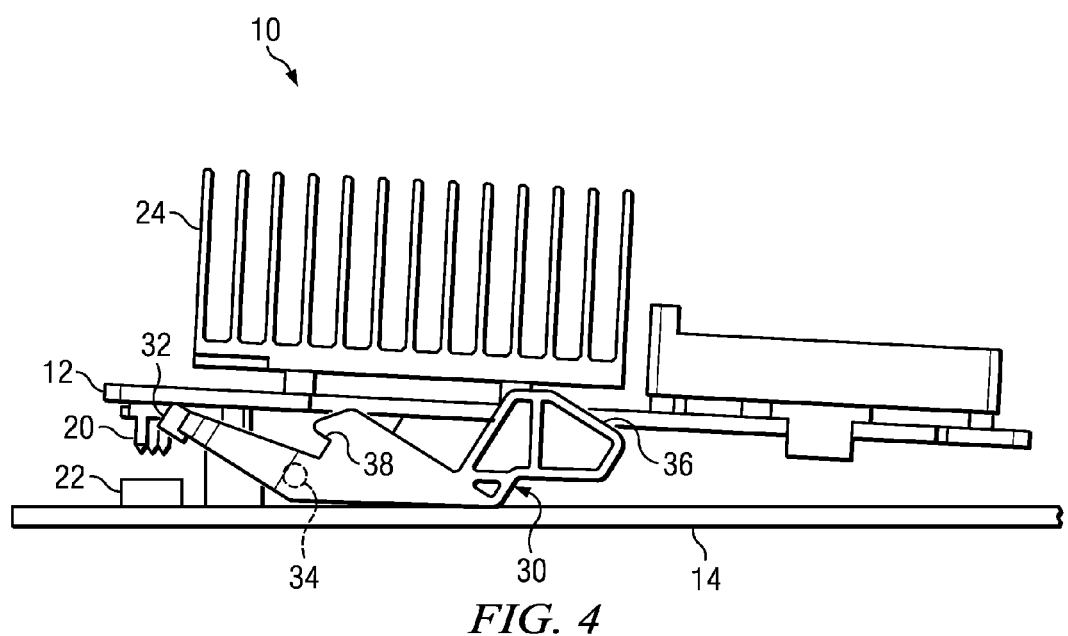
FIG. 4 depicts a side view of the retraction and latching device retracting the mezzanine circuit board connector from the motherboard connector in a retracted position.

Referring now to FIG. 4, a side view depicts the retraction and latching device retracting the mezzanine circuit board 12 connector 20 from the motherboard 14 connector 22 in a retracted position. Pressing down on actuation portion 36 generates a retraction force that is translated through rotation portion 34 into an upward force away from motherboard 14 and into the bottom surface of mezzanine circuit board 12. The upward force lifts mezzanine board 12 away from motherboard 14 proximate to connectors 20 and 22 to release the connectors from coupling with each other. Applying the retraction force at connectors 20 and 22 avoids the application of lateral forces to the connectors 20 and 22, thus minimizing the risk of damage to mezzanine board 12 and motherboard 14. Actuation portion 36 at both retraction arms 30 may receive the actuation force from a one-handed movement, with actuation portions 36 readily accessible above mezzanine circuit board 12.

Figure 5:
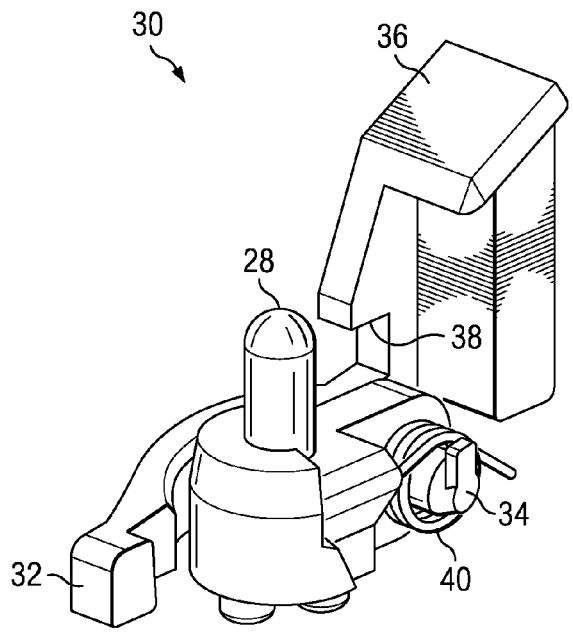
FIG. 5 depicts a side perspective view of the retraction and latching device separate from a motherboard.

Referring now to FIG. 5, a side perspective view depicts the retraction and latching device separate from a motherboard. Guidepost 28 couples to a motherboard in a preset position that ensures alignment of a mezzanine circuit card based on a preset board opening. The slanted face of actuation portion 36 above latching portion 38 helps to guide a mezzanine circuit board into position in latching portion 38 when the mezzanine circuit board is pressed downward. A spring 40 bias retraction arm 30 into a latched position to force latching portion 38 over the mezzanine circuit board during assembly. Pressing down on actuation portion overcomes the bias of the spring 40 to release latching portion 38 and, after latching portion 38 is clear of the mezzanine circuit board, to bring retraction portion 32 into contact with the bottom surface of the mezzanine circuit board. Rotation portion 34 in enclosed around guide post 28 for ease of assembly, although in alternative embodiments, the rotation portion might include an arc that works against an underlying motherboard surface.

Figure 6:
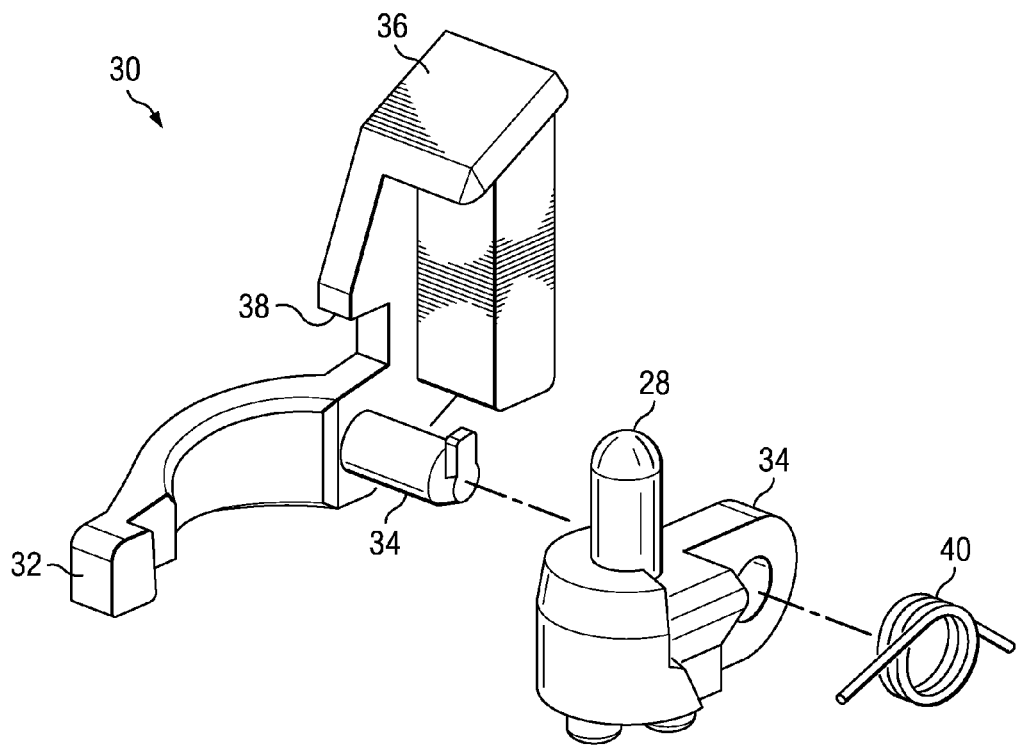
FIG. 6 depicts a blow-up view of the retraction and latching device.

Referring now to FIG. 6, a blow-up view depicts the retraction and latching device. Spring 40 assembles over rotation portion 34 to provide a bias towards the latched position. Retraction arm 30 includes an arc shape that allows rotation around guide post 28, although in alternative embodiments, retraction arm 30 can have alternative shapes and coupling points to guide post 28, such as by extending though an opening of guide post 28.

Although the present invention has been described in detail, it should be understood that various changes, substitutions and alterations can be made hereto without departing from the spirit and scope of the invention as defined by the appended claims.

What is claimed is:

1. An information handling system comprising:
   a circuit board operable to support processing components;
   plural processing components operable to communicate through the circuit board to process information;
   a circuit board connector disposed on the circuit board and interfaced with the processing components;
   a mezzanine board supporting one or more processing components and having a mezzanine connector disposed on a bottom surface, the mezzanine connector operable to couple to the circuit board connector with the mezzanine board bottom surface parallel to the circuit board; and
   a refraction arm coupled to the circuit board, the retraction arm having an actuation portion extending over the circuit board, a rotation portion coupled with the circuit board and a retraction portion contacting the mezzanine board proximate the circuit board connector, wherein the actuation portion translates a downward force towards the circuit board through the rotation portion into an upward force at the retraction portion to push the mezzanine board connector out of the circuit board connector.

2. The information handling system of claim 1 wherein the retraction arm further has a latching portion operable to engage the mezzanine board with the actuation portion raised upward to a locked position, the latching portion retaining the mezzanine board connector in the circuit board connector.

3. The information handling system so of claim 2 further comprising first and second retraction arms coupled to the circuit board proximate opposing sides of the circuit board connector, the first retraction arm retraction portion pushing on the mezzanine board proximate a first side of the circuit board connector and the second retraction arm retraction portion pushing on the mezzanine board proximate a second side of the circuit board connector.

4. The information handling system of claim 3 further comprising first and second alignment posts fixedly couple to the circuit board and rotationally coupled to the first and second retraction arms, the alignment posts operable to engage alignment openings of the mezzanine board to align the mezzanine board connector with the circuit board connector.

5. The information handling system of claim 4 further comprising first and second biasing devices coupled to the first and second alignment posts to maintain the first and second retraction arms raised upward in a locked position.

6. The information handling system of claim 1 wherein the actuation portion is further operable to move independent of the rotation portion to place the actuation portion in a stowed position.

7. The information handling system of claim 1 wherein the retraction portion further comprises a first refraction portion proximate a first side of the circuit board connector and a second portion proximate a second side of the circuit board connector so that a downward force at the actuation portion translates to an upward force at both sides of the circuit board connector.

8. The information handling system of claim 7 further comprising a biasing device coupled to the retraction arm to bias the actuation portion with an upward force.

9. The information handling system of claim 1 wherein the circuit board comprises a motherboard.

10. A method for selectively coupling a mezzanine circuit board to a motherboard, the method comprising:
 applying a downward force at an actuator portion of a retraction arm;
 translating the downward force into an upward force at a retraction portion of the retraction arm; and
 applying the upward force at the bottom surface of the mezzanine circuit board proximate a connector of the mezzanine circuit board to retract the mezzanine circuit board connector from a motherboard connector.

11. The method of claim 10 wherein translating the downward force into an upward force further comprises pivoting a rotation portion of the retraction arm against the motherboard.

12. The method of claim 10 further comprising biasing the actuator portion with an upward force.

13. The method of claim 10 further comprising:
 pressing a downward force on the mezzanine circuit board to force the mezzanine circuit board connector into the motherboard connector; and
 engaging a latching portion of the retraction arm with the mezzanine circuit board to maintain the mezzanine circuit board connector in the motherboard connector.

14. The method of claim 13 further comprising:
 aligning one or more openings of the mezzanine circuit board with one or more posts associated with the retraction arm to bring the mezzanine circuit board connector in alignment with the motherboard connector.

15. The method of claim 10 wherein the applying the upward force at the bottom surface of the mezzanine circuit board further comprises:
 applying the upward force with a first retraction portion at a first side of the mezzanine circuit board connector; and
 applying the upward force with a second retraction portion at a second side of the mezzanine circuit board connector.

16. The method of claim 15 wherein the first retraction portion receives an upward force translated from a first actuation portion and the second retraction portion receives an upward force translated from a second actuation portion.

17. The method of claim 15 wherein the first and second retraction portions receive an upward force translated from the same actuation portion.

\* \* \* \* \*